United States Patent [19]

Barcus

[11] 4,211,428
[45] Jul. 8, 1980

[54] TRAILER SAFETY HITCH

[76] Inventor: Nolla L. Barcus, 301 Spring Rd., Bartlesville, Okla. 74003

[21] Appl. No.: 853,222

[22] Filed: Nov. 21, 1977

[51] Int. Cl.$^2$ .......................................... B80D 1/06
[52] U.S. Cl. ............................................... 280/511
[58] Field of Search ............... 280/511, 504, 512–515, 280/432, 457, 499

[56] References Cited

U.S. PATENT DOCUMENTS

| | | | |
|---|---|---|---|
| 3,069,182 | 12/1962 | Hufford | 280/267 X |
| 3,876,242 | 4/1975 | Eaton | 280/511 X |
| 4,008,906 | 2/1977 | Schafer et al. | 280/511 |
| 4,072,320 | 2/1978 | Powell | 280/504 X |

Primary Examiner—Robert R. Song
Assistant Examiner—Norman L. Stack
Attorney, Agent, or Firm—Head & Johnson

[57] ABSTRACT

The invention includes a plate which is welded or otherwise suitably secured to the base of the trailer tongue in a substantially horizontal position. The plate has a pair of oppositely disposed arcuate slots therethrough in concentric relationship to the socket axis. The vehicle frame upon which a ball is mounted is also provided with a pair of vertical pins secured thereto which extend upwardly through the slots in the plate. Cotter keys are provided to maintain the vertical pins in the plate slots in the event of hitch failure.

5 Claims, 3 Drawing Figures

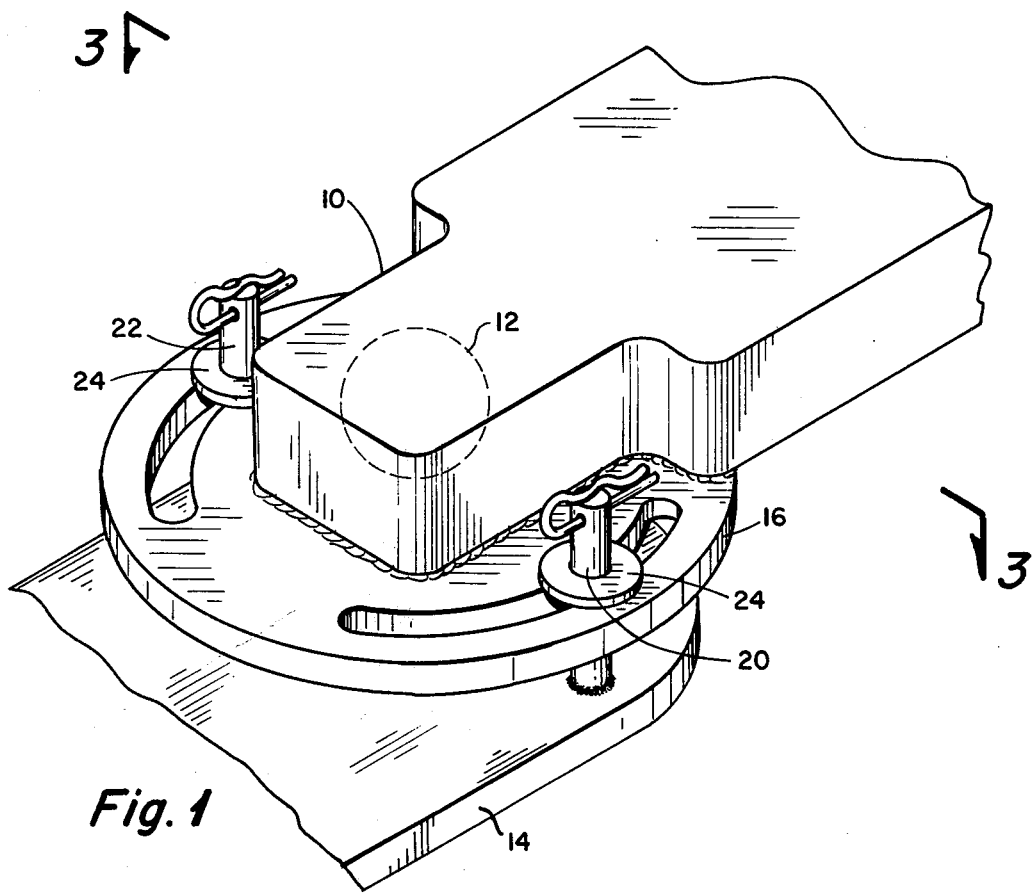
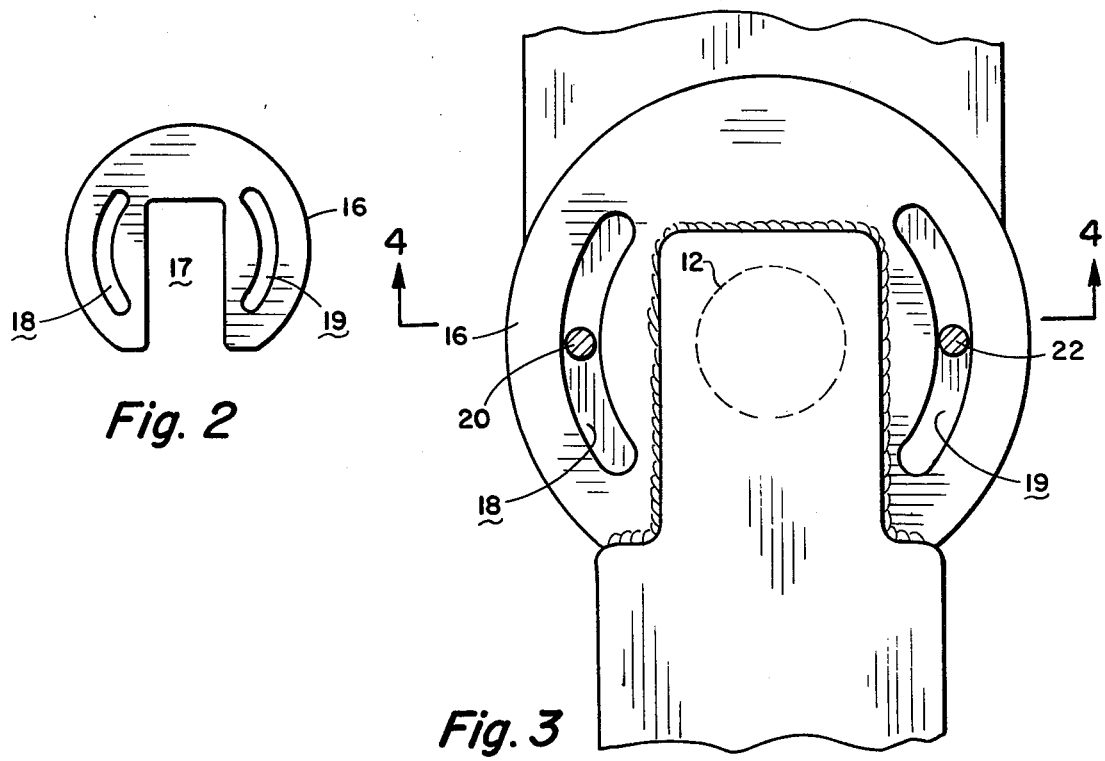

TRAILER SAFETY HITCH

BACKGROUND OF THE INVENTION

1. Field of the Invention

This invention relates to a trailer hitch and has as its primary object the provision of an improved means for safely securing a trailer tongue to a towing vehicle in addition to the usual ball and socket connection, which will prevent disengagement of the trailer from the vehicle in the event the ball and socket connection should fail.

2. Description of the Prior Art

The ball and socket trailer hitch is well known in the art. In such devices the ball element is normally welded or bolted to the rear bumper of the towing vehicle and the socket is constructed as an integral part of the trailer tongue. Such hitches are generally reliable but experience has taught that their use should be attended with adequate safety measures so that an unexpected hitch failure will not result in the trailer going astray on the highway at high speed thus endangering the public. The most common auxiliary safety device includes the use of short lengths of chain connected between the trailer and bumper. In fact, the use of chains as auxiliary safety means is often mandated by state law. Such chains are normally connected with a considerable amount of slack whenever the towing vehicle and trailer are in substantial alignment to permit the pivoting motion required during turning operations. If the ball and socket should become disengaged or the connection otherwise fails, the chains will confine the trailer behind the towing vehicle. However, the use of chains as the sole connecting means gives rise to most unstable and dangerous conditions. This is particularly true in the case of a two wheel trailer and even four wheel trailers tend to develop an oscillation type of motion.

Another trouble frequently encountered in the use of trailers results from instability during braking of the towing vehicle. In braking, the inertial force of the decelerating trailer is transmitted directly through the hitch to the vehicle. As long as the inertial forces pass through the center of resistance of the towing vehicle no rotational torque is produced. However, should a slight displacement of the direction of the force applied by the decelerating trailer occur with respect to the center of resistance of the towing vehicle the required conditions for jackknifing of the vehicle are present.

It is therefore an object of the present invention to provide an improved auxiliary safety means for a trailer hitch to replace the chain system currently in use and to incorporate into said safety means, means which will help prevent jackknifing of the vehicle and trailer.

SUMMARY OF THE INVENTION

The novel invention disclosed herein contemplates a simple and economical auxiliary safety apparatus primarily designed for use with the conventional ball and socket hitch connection which may be found in common use on today's highways. The apparatus of the preferred embodiment is easily adapted for use with existing vehicles and trailers with a minimum expense of effort and materials.

The invention includes a plate which is welded or otherwise suitably secured to the base of the trailer tongue in a substantially horizontal position. The plate has a pair of oppositely disposed arcuate slots therethrough in concentric relationship to the socket axis. The vehicle frame upon which the ball is mounted is also provided with a pair of vertical pins secured thereto which extend upwardly through the slots in the plate. Means are provided to maintain the pins in the plate slots in the event of hitch failure.

BRIEF DESCRIPTION OF THE DRAWINGS

FIG. 1 is a perspective view of a connected ball and socket hitch equipped with the auxiliary safety apparatus disclosed herein.

FIG. 2 is an elevational view of a preferred embodiment of a tongue plate shown apart from the tongue.

FIG. 3 is an elevational view, partly in section, of a preferred embodiment of the apparatus taken along line 3—3 of FIG. 1.

DESCRIPTION OF THE PREFERRED EMBODIMENT

Figure 4:
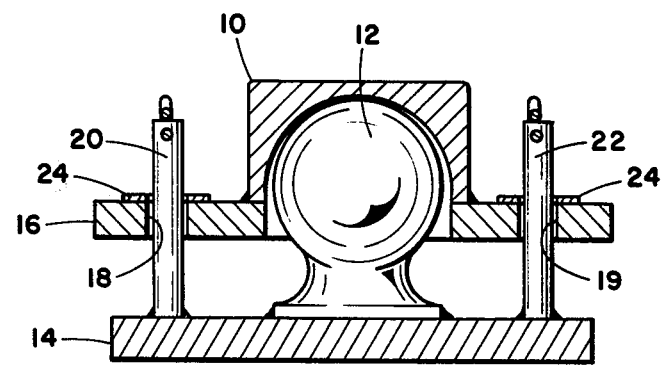
FIG. 4 is an end view partially in section taken along the broken line 4—4 of FIG. 3.

In the conventional ball and socket hitch a steel ball is mounted to the rear of the vehicle, normally on the bumper, and a concave socket of complimentary size to the ball is provided as an integral part of the trailer tongue. This type of hitch permits angular movement to occur between the trailer and towing vehicle during turning operations to facilitate mobility. A locking mechanism must also be provided to maintain the ball and socket in a cooperative relationship during use.

A portion of a trailer tongue, generally indicated by reference character 10, is shown in FIG. 1 of the drawings. The tongue is equipped with a standard socket and locking mechanism, not shown, complimentary to the size of the ball 12, which is secured to frame 14 in any suitable and well known manner. As ball and socket hitch connections are old and well known in the art, the details of same where immaterial to the present invention are omitted from the drawings for the sake of clarity. Horizontal frame 14, preferably constructed with steel, is secured to the towing vehicle or may be constructed as part of the vehicle rear bumper if desired.

Plate 16 is welded to the base of the trailer tongue 10, said plate having an opening 17 therein to permit normal cooperation between the ball and socket hitch elements. As shown in the drawings, a disc shape is the preferred configuration for plate 16 although said shape is not mandatory. The plate is also provided with a pair of oppositely disposed arcuate slots 18 and 19 which extend through the thickness of the plate in a concentric relationship to the socket cooperative axis. A pair of vertical pins 20 and 22 are mounted to frame 14 and extend upwardly through slots 18 and 19 respectively of plate 16. The location of said pins on the frame is such that the pins are positioned approximately at the slot arc length midpoint whenever the towing vehicle and the trailer are in substantially straight alignment with each other. Washers 24 are placed over the top of each pin and retained in position over plate 16 by means of keys 26 inserted in bores through the top of each pin.

It is readily observed that in the preferred embodiment of the invention described above no stresses are placed upon the auxiliary safety pins during normal towing operations. Should the principal ball and socket hitch fail, however, the pin and plate arrangement of the disclosed invention will prevent the trailer and towing vehicle from disengaging, while providing the same pivoting action of the ball and socket hitch.

It should also be noted that the degree of angular articulation between the towing vehicle and the trailer may be limited as desired by altering the arc length of slots 18 and 19 for a given radius. Maintenance of a relatively short slot arc length increases the vehicle-trailer turning radius required but prevents the vehicle and trailer from coming into the side to side relationship encountered in severe jackknifing cases when total loss of control occurs.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. Auxiliary safety apparatus for a trailer hitch of the type wherein a vehicle frame mounted ball cooperates with a trailer tongue mounted socket, which comprises:
   a substantially horizontal plate rigidly secured to the trailer tongue and having a pair of oppositely disposed arcuate slots therethrough in concentric relationship with the socket axis;
   a pair of vertical pins having diameter less than the slot width mounted to the frame and extending upwardly through the respective arcuate slots; and
   means separate from the frame for retaining the pins in said slots.

2. Auxiliary safety apparatus for a trailer hitch as recited in claim 1, wherein each of said pins has a radial bore in the upper portion thereof; and wherein the means for retaining the pins in said slots includes keys inserted through the pin bores.

3. Auxiliary safety apparatus for a trailer hitch as recited in claim 1, wherein said vertical pins are mounted to the frame such that they are positioned at substantially the midpoint of the slot arc length where the towing vehicle and the trailer are in substantial longitudinal alignment.

4. Auxiliary safety apparatus for a trailer hitch as recited in claim 1, wherein the horizontal plate member is rigidly secured to the bottom of the trailer tongue socket member, said plate member having an aperture in communication with said socket for receiving the ball member therethrough for normal cooperation between the ball and socket members and wherein said pair of oppositely disposed arcuate slots are transversely spaced on either side of said aperture, and wherein said pair of vertical pins are secured to the frame member on either side of the ball member and are of sufficient length to extend upwardly well above the upper surface of the horizontal plate.

5. Auxiliary safety apparatus for a trailer hitch as recited in claim 4 wherein each of said pins has a radial bore in the upper portion thereof, and wherein the means for retaining the pins in said slots includes a washer member slidably disposed on each pin above the slot and keys inserted through the pin radial bores.

* * * * *